United States Patent
Yoshida et al.

(10) Patent No.: US 8,411,239 B2
(45) Date of Patent: Apr. 2, 2013

(54) ARRAY SUBSTRATE, LIQUID CRYSTAL DISPLAY DEVICE, ELECTRONIC DEVICE

(75) Inventors: Masahiro Yoshida, Osaka (JP); Satoshi Horiuchi, Osaka (JP); Takaharu Yamada, Osaka (JP); Yuhko Hisada, Osaka (JP); Ryohki Itoh, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 13/145,757

(22) PCT Filed: Oct. 8, 2009

(86) PCT No.: PCT/JP2009/067572
§ 371 (c)(1),
(2), (4) Date: Jul. 21, 2011

(87) PCT Pub. No.: WO2010/092706
PCT Pub. Date: Aug. 19, 2010

(65) Prior Publication Data
US 2011/0273653 A1 Nov. 10, 2011

(30) Foreign Application Priority Data

Feb. 13, 2009 (JP) ................................. 2009-031789

(51) Int. Cl.
*G02F 1/1337* (2006.01)
(52) U.S. Cl. ........................................ 349/129; 349/117
(58) Field of Classification Search .................. 349/117, 349/129
See application file for complete search history.

(56) References Cited

U.S. PATENT DOCUMENTS

| | | | |
|---|---|---|---|
| 5,734,451 | A | 3/1998 | Yanagawa et al. |
| 5,831,708 | A | 11/1998 | Hiraishi et al. |
| 6,225,967 | B1 | 5/2001 | Hebiguchi |
| 6,249,326 | B1 | 6/2001 | Hebiguchi |

(Continued)

FOREIGN PATENT DOCUMENTS

| | | |
|---|---|---|
| EP | 1 873 748 A2 | 1/2008 |
| JP | 2-234119 | 9/1990 |

(Continued)

OTHER PUBLICATIONS

English translation of the Written Opinion mailed Dec. 22, 2009 in PCT application PCT/JP2009/067572.

(Continued)

*Primary Examiner* — Phu Vu
(74) *Attorney, Agent, or Firm* — Nixon & Vanderhye, P.C.

(57) ABSTRACT

An array substrate of the present invention includes: an insulating substrate; a plurality of scanning lines on the insulating substrate; a plurality of data lines each disposed so as to intersect the plurality of scanning lines on the insulating substrate; picture element electrodes each formed in a substantially rectangular shape, the picture element electrodes each being connected, via a switching element, to a corresponding scanning line and a corresponding data line, the picture element electrodes each having a long side disposed along a direction in which the plurality of scanning lines are extended and a short side disposed along a direction in which the plurality of data lines are extended, the picture element electrodes each having cut sections formed by cutting two corners of each of the picture element electrodes, the cut sections being formed so as to serve as alignment dividing means. This makes it possible, regarding an MVA liquid crystal display device, to easily ensure a sufficient process yield as well as improving display quality by ensuring a sufficient aperture ratio in each one pixel.

12 Claims, 8 Drawing Sheets

U.S. PATENT DOCUMENTS

| | | |
|---|---|---|
| 6,476,894 B1 | 11/2002 | Kikkawa |
| 2002/0118331 A1 | 8/2002 | Sakamoto et al. |
| 2003/0025866 A1 | 2/2003 | Kikkawa |
| 2003/0025870 A1 | 2/2003 | Kikkawa |
| 2003/0090599 A1 | 5/2003 | Ochiai et al. |
| 2004/0227888 A1 | 11/2004 | Tak et al. |
| 2005/0104069 A1 | 5/2005 | Jun et al. |
| 2005/0110924 A1 | 5/2005 | Kim et al. |
| 2006/0066797 A1 | 3/2006 | Baek |
| 2007/0091220 A1 | 4/2007 | Jun et al. |
| 2007/0171320 A1 | 7/2007 | Lin |
| 2007/0222915 A1 | 9/2007 | Niioka et al. |
| 2007/0225096 A1 | 9/2007 | Fujita et al. |
| 2007/0252146 A1 | 11/2007 | Yokomizo |
| 2008/0024706 A1 | 1/2008 | Yang et al. |
| 2008/0062345 A1 | 3/2008 | Lee |
| 2008/0094560 A1 | 4/2008 | Baek |
| 2008/0106664 A1 | 5/2008 | Lin |
| 2008/0210943 A1 | 9/2008 | Jun et al. |
| 2010/0033643 A1 | 2/2010 | Horiuchi et al. |
| 2010/0097535 A1 | 4/2010 | Inoue et al. |
| 2010/0110355 A1 | 5/2010 | Okazaki et al. |
| 2011/0187979 A1 | 8/2011 | Baek |

FOREIGN PATENT DOCUMENTS

| | | |
|---|---|---|
| JP | 9-159996 | 6/1997 |
| JP | 9-236826 A | 9/1997 |
| JP | 11326910 | 11/1999 |
| JP | 2001-083550 A | 3/2001 |
| JP | 2002-258320 A | 9/2002 |
| JP | 2005/123620 A | 5/2005 |
| JP | 2005-134889 | 5/2005 |
| JP | 2005-222046 A | 8/2005 |
| JP | 2006-091890 A | 4/2006 |
| JP | 2007-248999 | 9/2007 |
| JP | 2007-256330 A | 10/2007 |
| JP | 2007-298791 A | 11/2007 |
| JP | 2007-322904 A | 12/2007 |
| JP | 2008-304684 A | 12/2008 |
| WO | 2008-078441 A1 | 7/2008 |
| WO | 2008-087764 A1 | 7/2008 |
| WO | 2008/120492 A1 | 10/2008 |

OTHER PUBLICATIONS

International Search Report for PCT/JP2009/067572, mailed Dec. 22, 2009.

ARRAY SUBSTRATE, LIQUID CRYSTAL DISPLAY DEVICE, ELECTRONIC DEVICE

This application is the U.S. national phase of International Application No. PCT/JP2009/067572, filed 8 Oct. 2009, which designated the U.S. and claims priority to Japan Application No. 2009-031789, filed 13 Feb. 2009, the entire contents of each of which are hereby incorporated by reference.

TECHNICAL FIELD

The present invention relates to an array substrate provided in an MVA (Multi-domain Vertical Alignment) liquid crystal display device.

BACKGROUND ART

Liquid crystal display devices have problems such as a low contrast, a slow response speed, a narrow viewing angle and the like. For solving these problems, various techniques have been proposed.

For example, in a method called a Vertical Alignment (VA) mode, liquid crystal molecules of liquid crystals having a negative dielectric anisotropy are aligned in a vertical direction by use of a vertical alignment film in a case where voltage is not applied to the liquid crystals. As a result, a black display is carried out. Meanwhile, in a case where voltage is applied to the liquid crystals, the liquid crystal molecules are aligned in a horizontal direction. As a result, a white display is carried out. In this way, in the VA mode, when no voltage is applied, the liquid crystal molecules are vertically aligned. Accordingly, it is possible to obtain a display having little light leakage, a good black display quality, and a high contrast. Further, as compared to a TN (Twisted Nematic) mode, the liquid crystal molecules are arranged in a simpler manner because the liquid crystal molecules are not intricately twisted. Accordingly, when voltage is applied, a time for forming a state where the liquid crystal molecules are twisted is short, that is, a response speed is fast. Therefore, this VA mode has characteristics that are excellent in contrast and responsiveness.

Meanwhile, as a technique for widening a viewing angle, for example, a method of driving liquid crystals by use of a Multi-Domain design has been proposed. In the Multi-Domain design, one picture element region is divided into a plurality of sectional parts and liquid crystal molecules in each sectional part are aligned in a direction that is different for each sectional part. In this mode, in each picture element region, liquid crystal molecules aligned in different directions are present. Accordingly, a view is not limited in a specific direction. Therefore, a viewing angle can be widened.

Furthermore, in recent years, a technique called MVA (Multi-domain Vertical Alignment) in which the VA mode and the Multi-Domain design are combined has been proposed.

In an MVA liquid crystal display devices, alignment dividing means (a protrusion or a cutout section of an electrode) is formed also in an area relevant to display. Therefore, an effective display area tends to be smaller. This causes a problem such that, if the effective display area is ensured, it becomes difficult to provide a large storage capacitance.

Furthermore, in recent years, a distance between a picture element electrode and each signal line has become shorter (or an overlap amount of the picture element electrode and each signal line has become larger) due to demands for a higher aperture ratio and dot size reduction caused by an increased fineness). Therefore, a parasitic capacitance (Csd) between a picture element electrode and a data line tends to be larger with respect to a total pixel capacitance. In a case where the parasitic capacitance (Csd) between the picture element electrode and the data line becomes lager as described above, there arises a problem of deterioration in display quality, such as shadowing, uneven display within a panel plane, and the like.

In order to solve such problems, Patent Literature 1 discloses a technique in which, as shown in FIG. 14, a shield electrode 88 is provided on a protective film 180 above a data line 171 so that a parasitic capacitance (Csd) between a picture element electrode 190 and the data line 171 is reduced.

CITATION LIST

Patent Literature

[Patent Literature 1]
Japanese Patent Application Publication, Tokukai, No. 2005-134889 A (published on May 26, 2005)

SUMMARY OF INVENTION

Technical Problem

However, according to the technique disclosed in Patent Literature 1, a sufficient distance is required between the shield electrode 88 and the picture element electrode 190 for preventing a short circuit between the shield electrode 88 and the picture element electrode 190. This makes it difficult to ensure an effective display area in one picture element. This consequently causes a problem of deterioration in display quality. Further, because the shield electrode needs to be provided separately from the picture element electrode, there arises a problem such that it becomes difficult to ensure a sufficiently high process yield of an array substrate.

The present invention is attained in view of the above problems. An object of the present invention is to provide an array substrate that makes it possible to easily ensure a sufficiently high process yield as well as improving a display quality by ensuring an effective display area in one picture element, in an MVA liquid crystal display device.

Solution to Problem

In order to solve the problem described above, an array substrate of the present invention provided in a multi-domain liquid crystal display device in which one picture element region is divided into a plurality of sectional parts and liquid crystal molecules are aligned in directions that are different in respective sectional parts, the array substrate includes: an insulating substrate; a plurality of scanning lines on the insulating substrate; a plurality of data lines each disposed so as to intersect the plurality of scanning lines on the insulating substrate; picture element electrodes each formed in a substantially rectangular shape, the picture element electrodes each being connected, via a switching element, to a corresponding scanning line and a corresponding data line, the picture element electrodes each having a long side disposed along a direction in which the plurality of scanning lines are extended and a short side disposed along a direction in which the plurality of data lines are extended, the picture element electrodes each having cut sections formed by cutting two corners of each of the picture element electrodes, the cut sections being formed so as to serve as alignment dividing means.

According to the above configuration, a long side of the picture element electrode is disposed along a direction in which the plurality of scanning lines are extended and a short side of the picture element electrode is disposed along a direction in which the plurality of data lines are extended. This configuration makes it possible to reduce a proximity distance of a picture element electrode with respect to a data line as compared to a case of a picture element electrode whose long side is disposed along a direction in which the plurality of data lines are extended and whose short side is disposed along a direction in which the plurality of scanning lines are extended, which picture element electrode is longer in a vertical direction.

This makes it possible to reduce a parasitic capacitance (Csd) that is produced between the picture element electrode and the data line which parasitic capacitance (Csd) increases in proportion to the proximity distance of the picture element electrode with respect to the data line.

Further, because two corners of the picture element electrode are cut so that the two corners serve as alignment dividing means. This makes it possible to further reduce the proximity distance of the picture element electrode with respect to the data line and the proximity distance between the picture element electrode and a scanning line. As a result, parasitic capacitances (Csd, Cgd) that are produced in accordance with these proximity distances can be reduced. Here, the proximity distance of the picture element electrode with respect to the data line is a length of a portion of a side of the picture element electrode which portion is parallel to the data line on a side provided with the data line. Further, the proximity distance of the picture element electrode with respect to the scanning line is a length of a portion of a side of the picture element electrode which portion is parallel to the scanning line on a side provided with the scanning line.

According to the above description, it is possible to reduce the parasitic capacitance (Csd) that is produced between the picture element electrode and the data line and the parasitic capacitance (Cgd) that is produced between the picture element electrode and the scanning line. As a result, for reducing a ratio of the parasitic capacitance with respect to a total picture element capacitance, a large storage capacitance is not required. In other words, the above configuration makes it possible to improve display quality by eliminating shadowing while an effective display area is not reduced.

Preferably, the cut sections are at two adjacent corners of each of the picture element electrodes.

The cut sections formed at any two corners of the picture element electrode can provide the above-described effect, that is, an effect such that a ratio of the parasitic capacitance with respect to a total picture element capacitance is reduced. However, in a case where formation of multi-domain having four alignment directions is assumed, the cut sections formed to the picture element electrode are preferably formed at two adjacent corners of the picture element electrode.

Note that in a case where multi-domain having two alignment directions is assumed, the cut sections formed at two corners of the picture element electrode can be formed at two corners opposed to each other in the picture element electrode.

Each of the picture element electrodes may be formed so as to cover at least a part of a scanning line for driving an adjacent picture element electrode.

According to the above configuration, the picture element electrode is formed so as to cover at least a part of a scanning line for driving an adjacent picture element electrode. Accordingly, the picture element electrode overlapping the scanning line functions as a shield electrode against an electric field of the scanning line.

This makes it possible to further reduce the parasitic capacitance (Cgd) between the picture element electrode and the scanning line.

The more the picture element electrode overlaps with the scanning line, the higher the function as a shield becomes.

A shield electrode may be formed between a picture element electrode and a scanning line for driving an adjacent picture element electrode.

According to the above configuration, the shield electrode is formed between the picture element and the scanning line. Accordingly, an electric field from the scanning line toward the picture element electrode can be shielded. This makes it possible to further reduce the parasitic capacitance (Cgd) between the picture element electrode and the scanning line.

The array substrate may be arranged such that: the shield electrode is connected to a drain electrode of the switching element via a connecting electrode; the picture element electrode has a cutout section having a letter V shape, the cutout section being formed separately from the cut sections at the two corners and serving as alignment dividing means; and the connecting electrode is provided at a bent section of the cutout section.

In general, a section where alignment dividing means whose directions are different or extended lines of the alignment dividing means come in contact forms a boundary section between regions having different liquid crystal alignment directions. This section is not preferable as a display area because an alignment direction is not stable or liquid crystals are aligned in undesirable directions in this section. Meanwhile, in a case where the connecting electrode is made of a drain electrode material, a section where the connecting electrode is provided does not serve as a display area. That is, as in the above configuration, the connecting electrode is provided at the bent section of the cutout section. In other words, sections which do not function (which are not preferable) as a display area are superimposed. This makes it possible to prevent the effective display area from being reduced excessively.

When the cutout section of the picture element electrode is formed on the scanning line for driving the adjacent picture element electrode, the shield electrode may be disposed along a shape of the cutout section.

According to the above configuration, it is possible to suppress a defect in alignment that occurs in a case where the cutout section of the picture element electrode is formed on the scanning line. In other words, in a case where the cutout section is formed on the scanning line, impurity ions may be trapped in a period in which voltage is retained (in a period where a potential of the scanning line is low). As a result, a section where the impurity ions are trapped may become a peculiar point and may cause a defect in alignment of liquid crystals, that is, defect in display. Further, due to an electric field of a scanning line, liquid crystals in the vicinity of the scanning line may be aligned in a direction that is not preferable. However, by disposing the shield electrode along the shape of the cutout section as described above, the electric field of the scanning line is shielded by the shield electrode. Therefore, it is possible to prevent the defect in display.

When the cut sections of each of the picture element electrodes are formed at two adjacent corners along the corresponding scanning line, a cut distance of the short side of each of the picture element electrode is preferably 14 μm or more.

In general, when a picture element pitch indicating a distance between picture element electrodes and/or a size of the picture element electrode vary, an optimum layout of the cutout section and the protrusion for having a large effective display area also varies. In particular, in a case where a length L1 is a length from an edge of the cut section of the picture element electrode to an edge of an area where the protrusion on the counter substrate is projected onto the picture element electrode which edge of the area is on a side provided with the cut section and the length L1 is arranged to be too long, a response speed of the liquid crystals tends to deteriorate. Accordingly, in a case where the picture element electrode is large, it is possible to have an arrangement in which each of the cutout section and the protrusion are plurally provided. Therefore, for causing the cut section to serve as the alignment dividing means, a cut distance of L2 of a short side of the picture element electrode needs to be, for example, 14 µm or more as described above. By setting L2 to 14 µm or more, the parasitic capacitance (Csd) produced between the picture element electrode and the data line and the parasitic capacitance (Cgd) produced between the picture element electrode and the scanning line can be adequately reduced even in a case where various layouts of the cutout section and the protrusion that provide an appropriate response speed and an appropriate effective display area are selected freely.

The array substrate may further includes: a storage capacitance line formed in a layer where the plurality of scanning lines are formed; and a storage capacitance counter electrode formed in a layer where the plurality of data lines are formed, the storage capacitance counter electrode being connected to a drain electrode of the switching element, the storage capacitance line and the storage capacitance counter electrode being formed so as to overlap with each other via an insulating film.

According to the above configuration, because the storage capacitance line and the storage capacitance counter electrode are formed so as to be overlap each other via an insulating film, a storage capacitance can be formed in the picture element electrode.

This makes it possible to increase a total capacitance of one picture element by a storage capacitance. Accordingly, it is possible to reduce a ratio of the parasitic capacitance with respect to the total capacitance. In other words, by reducing a ratio of the parasitic capacitance with respect to the total capacitance, deterioration in level of shadowing can be prevented and an effective display area can be increased. This makes it possible to improve display quality.

Advantageous Effects of Invention

The present invention is an array substrate provided in a multi-domain liquid crystal display device in which one picture element region is divided into a plurality of sectional parts and liquid crystal molecules are aligned in directions that are different in respective sectional parts, the array substrate including: an insulating substrate; a plurality of scanning lines on the insulating substrate; a plurality of data lines each disposed so as to intersect the plurality of scanning lines on the insulating substrate; picture element electrodes each formed in a substantially rectangular shape, the picture element electrodes each being connected, via a switching element, to a corresponding scanning line and a corresponding data line, the picture element electrodes each having a long side disposed along a direction in which the plurality of scanning lines are extended and a short side disposed along a direction in which the plurality of data lines are extended, the picture element electrodes each having two corners cut so that the two corners serve as alignment dividing means. This makes it possible to improve display quality by ensuring an effective display area in one picture element.

DESCRIPTION OF EMBODIMENTS

The following explains one embodiment of the present invention. Note that the present embodiment explains a liquid crystal display device (hereinafter, referred to as an MVA liquid crystal display device) of an MVA (Multidomain Vertical Alignment) mode in which one picture element region is divided into a plurality of domains. Further, note that one picture element region does not indicate only a region corresponding to a picture element electrode directly connected to a switching element, but does include a region of a sub-picture element electrode connected via a coupling capacitance to a switching element or a picture element connected to the switching element. The one picture element region also includes a region in a case where the picture element electrode and the sub-picture element electrode each connected to the switching element are viewed as one unit.

Figure 2:
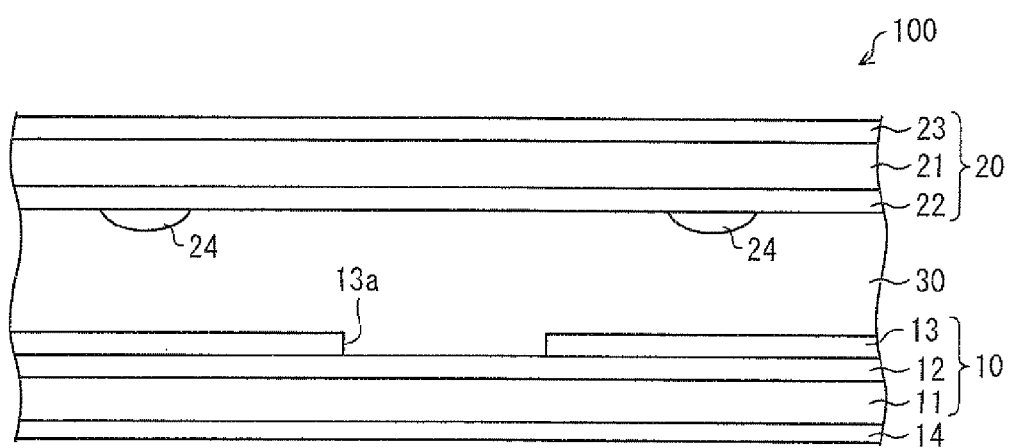
FIG. 2 is a schematic cross sectional view illustrating a liquid crystal display device including the array substrate shown in FIG. 1.]

As shown in FIG. 2, the MVA liquid crystal display device of the present embodiment includes an array substrate 10 as a first substrate, a counter substrate 20 as a second substrate, a liquid crystal layer 30 that is sandwiched between the array substrate 10 and the counter substrate 20. This liquid crystal layer 30 is made of a liquid crystal material whose dielectric anisotropy is negative.

The array substrate 10 at least includes an insulating substrate 11, an interlayer insulating film 12 formed on a first surface of the insulating substrate 11, a picture element electrode 13 formed on the interlayer insulating film 12, and a polarizer 14 formed on a second surface of the insulating substrate 11 which second surface is opposite to the first surface on which the interlayer insulating film 12 is formed. Further, though not shown, the array substrate 10 is configured to include a vertical alignment film on a top surface of the array substrate 10 on a side provided with the liquid crystal layer 30.

Though not shown, on the array substrate 10, a plurality of scanning lines, a plurality of data lines, and switching elements are formed. Note that the scanning lines, the data lines, and the switching elements are explained later in detail.

A part of the picture element electrode 13 of the array substrate 10 is cut out and serves as alignment dividing means for dividing alignment of liquid crystals. Further, in the present embodiment, in the picture element electrode 13 of the array substrate 10, cut sections 13a are formed. The cut sections 13a also serve as alignment dividing means. Note that the cut sections 13a and a cutout section (13b) of the picture element electrode 13 are explained later in detail.

The counter substrate 20 includes an insulating substrate 21, a common electrode 22 formed on a first surface of the insulating substrate 21, a polarizer 23 formed on a second surface of the insulating substrate 21 which second surface is opposite to the first surface on which the common electrode 22 is formed, and a protrusion 24 as alignment dividing means formed on the common electrode 22. Further, though not shown, the counter substrate 20 is configured to include a vertical alignment film on an outermost surface of the counter substrate 20 on a side provided with the liquid crystal layer 30.

Note that the present embodiment shows, as an example, an arrangement in which the protrusion 24 that is a protruding structure is formed as the alignment dividing means. However, it is also possible to cause a cutout section obtained by cutting the counter electrode 22 to serve as the alignment dividing means. A shape of the protrusion 24 is not limited to a shape shown in FIG. 2. For example, the protrusion 24 may have a triangular cross section or trapezoidal cross section.

Figure 1:
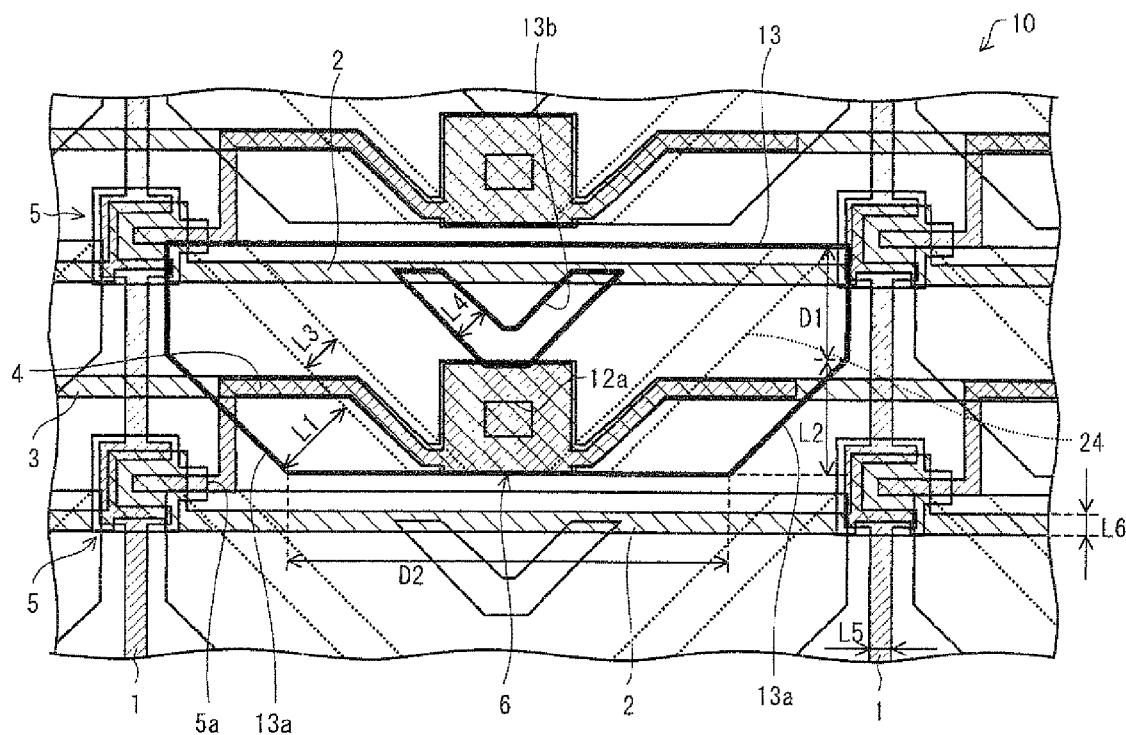
FIG. 1 is a schematic plan view illustrating an array substrate according to one embodiment of the present invention.

As shown in FIG. 1, the array substrate 10 is configured as follows. That is, on the array substrate 10, a plurality of data lines 1 and a plurality of scanning line 2 are provided so as to intersect each other. At each intersection of the data lines 1 and the scanning lines 2, a switching element 5 is formed. The picture element electrode 13 is connected to a drain electrode 5a of each switching element 5. These lines and electrodes are fabricated by the same method as a method for fabricating a general array substrate used for an MVA liquid crystal display device. A position of the switching element 5 is not specifically limited. In the present embodiment, the switching element 5 is provided in an area that does not contribute to display, that is, at each intersection of the data lines 1 and the scanning lines 2 so that an effective display area is not decreased.

Further, the array substrate 10 has a storage capacitance that is formed by superimposing a storage capacitance line 3 and a storage capacitance counter electrode 4 via an insulating film (not shown). The storage capacitance line 3 is formed in the same layer as the scanning lines 2. The storage capacitance counter electrode 4 is formed in the same layer as the data lines 1 and connected to a drain electrode 5a of the switching element 5. Here, when viewed in one plane, preferably, a storage capacitance formation section 6 in which the storage capacitance is formed overlaps with the protrusion 24 (a member indicated by a broken line in FIG. 1) as alignment dividing means on the counter substrate 20 for the purpose of obtaining a larger effective display area.

Here, the following explains the picture element electrode 13 in detail.

As shown in FIG. 1, the picture element electrode 13 has a substantially rectangular shape and disposed so that a long side of the picture element electrode 13 is in a direction in which the scanning lines 2 are extended and a short side thereof is in a direction in which the data lines 1 are extended. Further, two corners of the picture element electrode 13 are cut so as to form the cut sections 13a on a side provided with a corresponding scanning line 2 that drives the picture element electrode 13.

Each of the cut sections 13a is obtained by cutting the picture element electrode 13 so that each of the cut section 13a has a slope that is substantially parallel to a slope of the protrusion 24 provided on the counter substrate 20. Therefore, the cut sections 13a serve as alignment dividing means.

Further, separately from the cut sections 13a, the picture element electrode 13 is provided with the cutout section 13b that serves as alignment dividing means. This cutout section 13b is formed in a substantially letter V shape, by cutting the picture element electrode 13 so that the cut section 13b serves as the alignment dividing means and has a slope that is substantially parallel to the slope of the protrusion 24.

In addition, the picture element electrode 13 overlaps a scanning line 2 that corresponds to an adjacent picture element electrode 13. Note that, preferably, the picture element electrode 13 is formed so as to cover this scanning line 2 completely over a width of the scanning line 2.

In this way, by optimizing positions of cut sections (the cut sections 13a and the cutout section 13b) of the picture element electrode 13 that are used as the alignment dividing means necessary for an MVA liquid crystal display device, proximity distances of the picture element electrode 13 for which proximity distance the picture element electrode 13 is close to the scanning line 2 and the data line 1 can be reduced. This consequently makes it possible to reduce a parasitic capacitance.

The following describes effects of reducing the proximity distance in each point of the present invention.

Generally, in a liquid crystal display device for color display, at least three picture elements as a set including a Red picture element, a Green picture element, and a Blue picture element form one substantially square pixel. Accordingly, one picture element has a substantially rectangular shape.

Here, if a long side direction of the picture element electrode is arranged to be in a direction in which a data line is extended, a parasitic capacitance (Csd) between the picture element electrode and the data line becomes large. A ratio (=Csd/Cpix) of Csd to a total capacitance Cpix (a sum of a liquid crystal capacitance, a storage capacitance, and a parasitic capacitance) of one picture element relates to a degree of influence that liquid crystal application voltage receives due to a change in potential of the data line in a period in which the picture element electrode retains voltage.

More specifically, a level of shadowing deteriorates as the Csd/Cpix increases. In recent years, because of demands for a reduced dot size arising from an increased fineness and for a higher aperture ratio, a distance between a picture element electrode and each signal line has become shorter (or an overlap amount of the picture element electrode and each signal line increases). Accordingly, Csd tends to be larger.

Further, in an MVA liquid crystal display device, the alignment dividing means (e.g., a protruding structure on the counter substrate, and/or the like) makes it difficult to have a large effective display area. Therefore, in a high-luminance and low-power-consumption display device that requires a higher aperture ratio, it is difficult to have a large storage capacitance. As a result, the Csd/Cpix tends to be larger.

Figure 3:
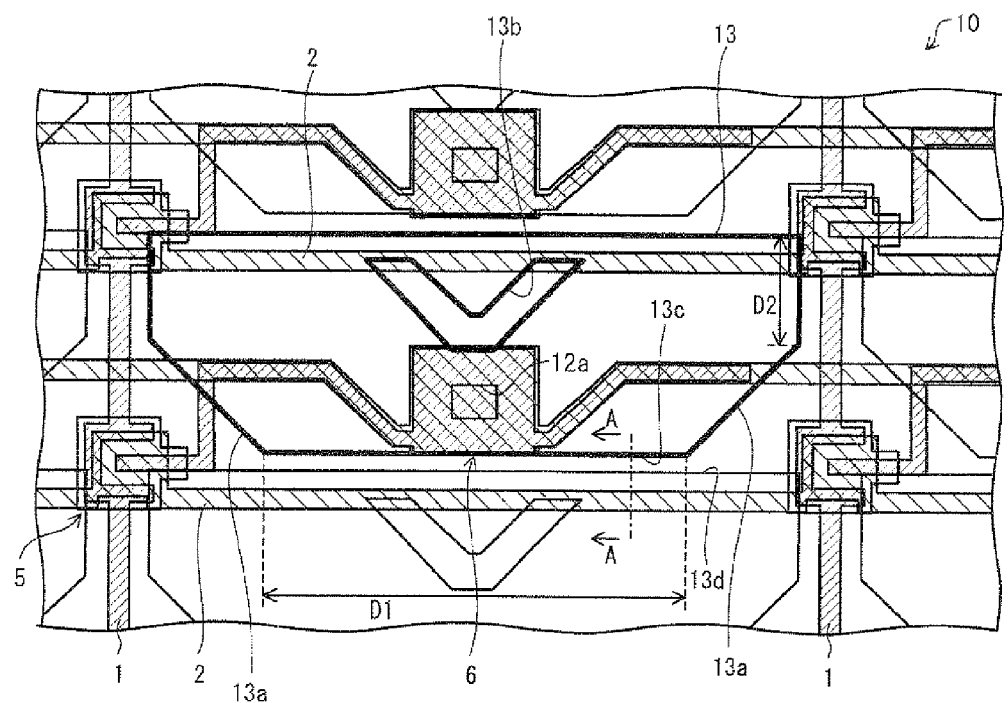
FIG. 3 is a schematic plan view illustrating the array substrate shown in FIG. 1 from which a protrusion on a counter substrate is omitted.

In order to solve the above problem, according to the array substrate 10 of the above configuration, as shown in FIG. 3, a short side of the picture element electrode 13 is arranged to be in a direction in which the data lines 1 are extended and the cut sections 13a of the picture element electrode 13 serving as alignment dividing means are provided on respective sides of the picture element electrode 13 each of which respective sides is provided with a data lines 1. Accordingly, it is possible to shorten a proximity distance D2 of the picture element electrode 13 with respect to the data line 1 and consequently to reduce Csd.

For example, in a case where a picture element pitch shown in FIG. 3 is 190.5 μm×63.5 μm and a size of the picture element electrode 13 is 173.5 μm×58.5 μm, the proximity distance D2 of the picture element electrode 13 with respect to the data line 1 is 28.25 μm.

Meanwhile, the picture element electrode 13 having the above-described picture element size is disposed so that a long side of the picture element electrode 13 is in a vertical direction, the proximity distance of the picture element electrode 13 with respect to the data line becomes 173.5 μm.

As described above, a long side of the picture element electrode 13 is disposed along a direction in which the scanning lines 2 are extended and a short side of the picture element electrode 13 is disposed along a direction in which the data lines 1 are extended. As a result, the proximity distance of the picture element electrode 13 with respect to the data line 1 is significantly reduced and becomes approximately ⅙ as compared to a case where the picture element electrode 13 is longer in the vertical direction, that is, a long side of the picture element electrode 13 is disposed along a direction in which the data lines 1 are extended and a short side of the picture element electrode 13 is disposed along a direction in which the scanning lines 2 are extended. Further, Csd is also reduced in accordance with the ratio of approximately ⅙. In other words, even in a case where a storage capacitance of the same size (having the same aperture ratio) is provided, display quality in regard to shadowing or the like can be improved by arranging the picture element electrode 13 as shown in FIG. 3.

Note that in a case where the picture element electrode 13 is provided so as to be longer sideways, a proximity distance D1 of the picture element electrode 13 with respect to the scanning line 2 becomes longer and a parasitic capacitance (Cgd) between the picture element electrode 13 and the scanning line 2 tends to be larger. The Cgd/Cpix is also a parameter that influences display quality. More specifically, a certain level of the Cgd/Cpix causes flickering and/or appearance of uneven luminance blocks.

Accordingly, for reducing a trade-off caused by reduction of Csd, in the array substrate 10 of the above configuration, as shown in FIG. 3, the cut sections 13a of the picture element electrode 13 as alignment dividing means are provided on a side provided with the scanning line 2 for driving the picture element electrode 13. This makes it possible to shorten the proximity distance D1 of the picture element electrode 13 with respect to the scanning line 2. Therefore, it is possible to reduce Cgd.

However, even in a case where the picture element electrode 13 is provided with the cut sections 13a as the alignment dividing means, the proximity distance D2 of the picture element electrode 13 with respect to the scanning line 2 becomes 113 μm if a size of the picture element electrode 13 is 173.5 μm×58.5 μm. This is longer than the proximity distance D2 of 58.5 μm of the picture element electrode 13 with respect to the scanning line 2 in a case where the picture element electrode 13 of the above size (173.5 μm×58.5 μm) is disposed so that the picture element electrode 13 is longer in a vertical direction.

Accordingly, in the array substrate 10, by overlapping the picture element electrode 13 on an adjacent scanning line 2, the picture element electrode 13 is caused to function as a shield electrode against an electric field of the adjacent scanning line 2. In this way, the parasitic capacitance (Cgd) between the picture element electrode 13 and the scanning line 2 is reduced.

The following explains a degree of shielding effects obtained against an electric field of the scanning line 2 by overlapping the picture element electrode 13 onto the adjacent scanning line 2 and a degree of reduction in Cgd as a result of the shielding effects, with reference to a simulation.

Here, conditions for the simulation is as shown in Table 1 (For the simulation, "2din-DIMOS" manufactured by AUTORONIC-MELCHERS GmbH is used).

TABLE 1

| Dielectric Constant | | Film Thickness | | Potential | |
|---|---|---|---|---|---|
| Gate Insulating Film | 6.9 | Gate Insulating Film | 0.4 um | Scanning Line | −10 V |
| Protective Film | 6.9 | Protective Film | 0.3 um | Common Electrode | ±0 V |
| Glass Substrate | 5.5 | Scanning Line | 0.35 um | Driving Pixel Electrode | +5 V |
| Liquid Crystal Layer | 5.0 | Liquid Crystal Layer | 3.2 um | Adjacent Pixel Electrode | −5 V |
| Interlayer Insulating Film | 3.4 | Interlayer Insulating Film | 3.0 um | | |

Figure 4:
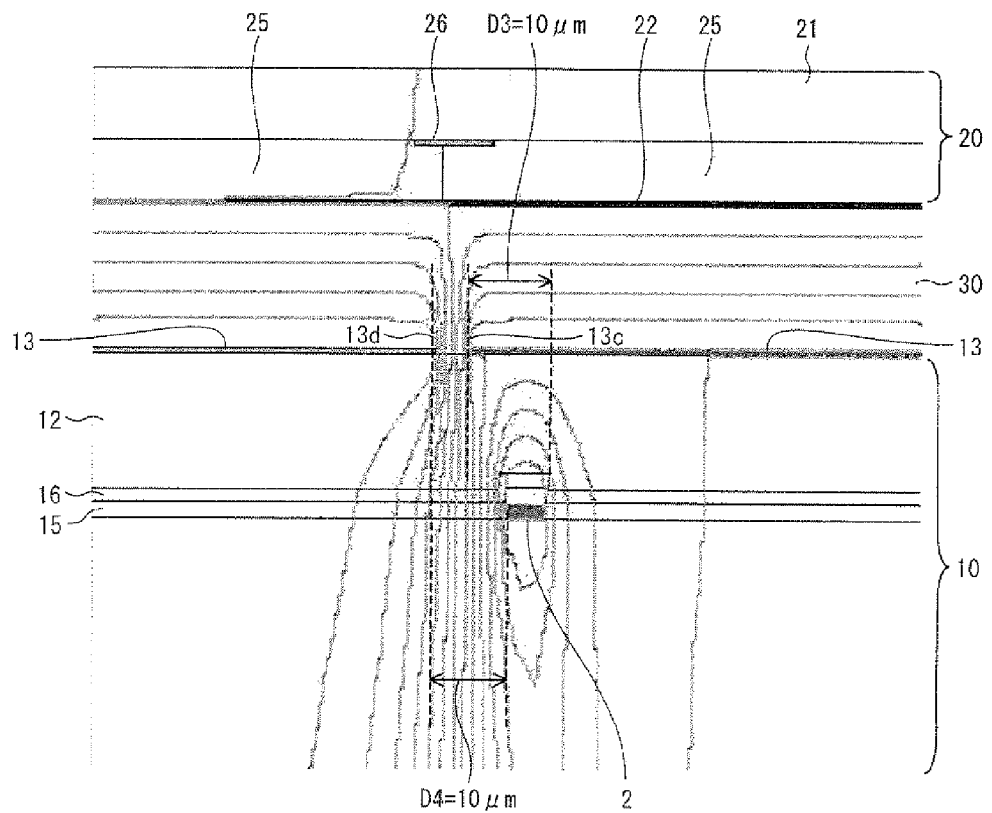
FIG. 4 is a cross sectional view taken along a line A-A in the direction of arrows in FIG. 3.

FIG. 4 is a cross sectional view taken along a line A-A of the array substrate 10 in the direction of arrows in FIG. 3. That is, FIG. 4 is a cross sectional view of the array substrate 10 having a structure in which an adjacent picture element electrode 13 overlaps the scanning line 2. This configuration is called a configuration of the present application.

In FIG. 4, in the configuration of the present application, an overlap amount D3 of the adjacent picture element electrode 13 onto the scanning line 2 is 10 μm (the adjacent element electrode 13 is extended by 5 μm over the scanning line 2 having a line width of 5 μm), and a distance D4 between an edge of the scanning line 2 and an edge of the picture element electrode 13 is 10 μm. In this configuration, a parasitic capacitance per unit distance is $1.49 \times 10^{-11}$ F/m.

Figure 5:
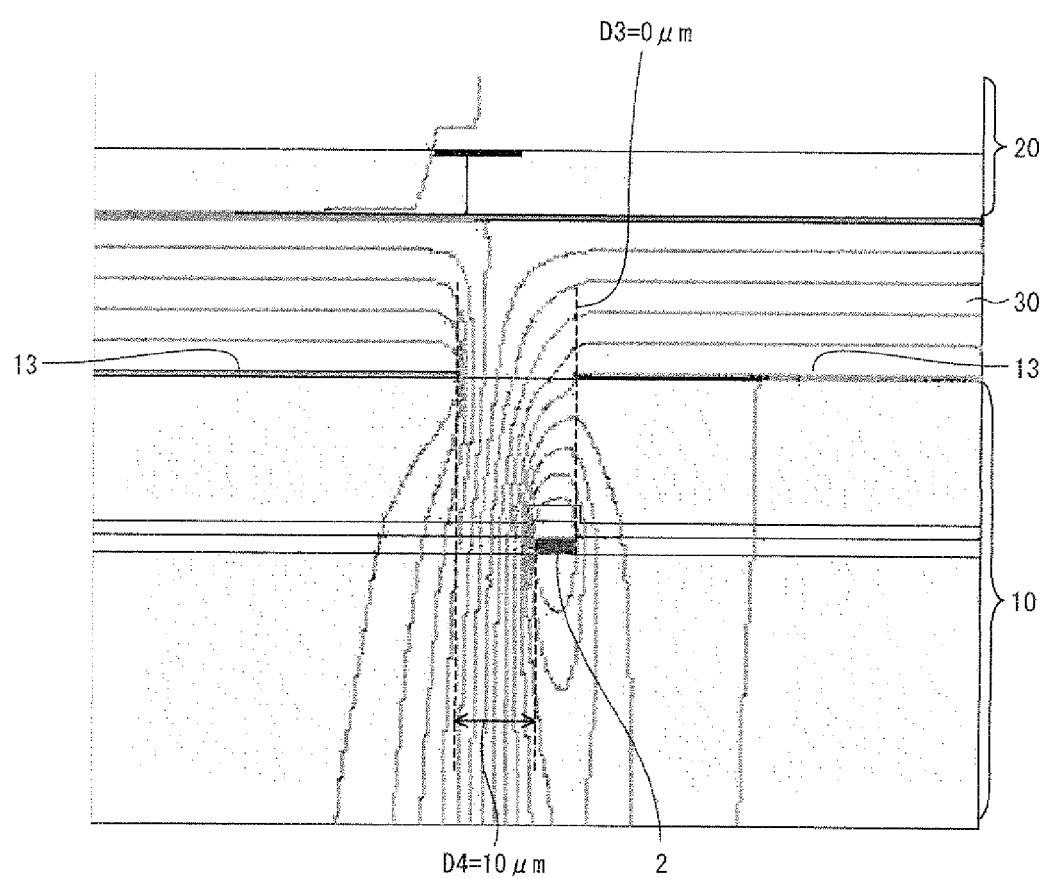
FIG. 5 is a schematic cross sectional view of a liquid crystal display device, illustrating a configuration of Comparative Example (1) as compared to the cross sectional view shown in FIG. 4.

FIG. 5 is a cross sectional view of an array substrate 10 having a configuration in which, unlike the configuration of the present invention, the adjacent picture element electrode 13 does not overlap the scanning line 2 and an aperture ratio of the same level as that of the configuration of the present invention is expected. This configuration is referred to as a configuration of Comparative Example (1).

In FIG. 5, according to the configuration of Comparative Example (1), the overlap amount D3 of the adjacent picture element electrode 13 onto the scanning line 2 is 0 μm and the distance D4 between the edge of the scanning line 2 and the edge of the picture element electrode 13 is 10 μm. According to this configuration, a parasitic capacitance per unit distance is $1.78 \times 10^{-11}$ F/m.

Figure 6:
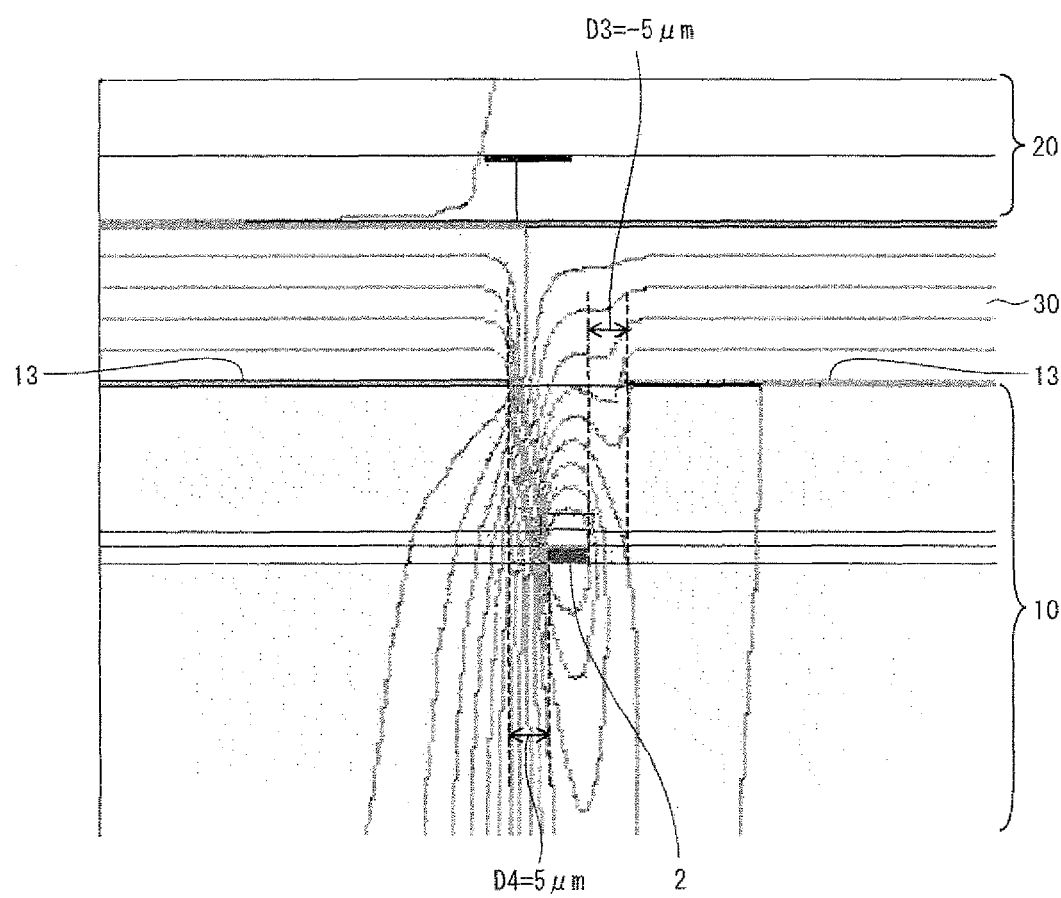
FIG. 6 is a schematic cross sectional view of a liquid crystal display device, illustrating a configuration of Comparative Example (2) as compared to the cross sectional view shown in FIG. 4.

FIG. 6 is a cross sectional view of an array substrate 10 having a configuration in which, unlike the configuration of the present invention, the adjacent picture element electrode 13 does not overlap the scanning line 2 and an aperture ratio of the same level as that of the configuration of the present invention is expected. This configuration is referred to as a configuration of Comparative Example (2).

In FIG. 6, according to the configuration of Comparative Example (2), the overlap amount D3 of the adjacent picture element electrode 13 onto the scanning line 2 is −5 μm (a configuration in which both the picture element electrode 13 to be driven and the adjacent picture element electrode 13 are apart from the scanning line 2 and a distance between the picture element electrode 13 and the scanning line 2 is 5 μm) and the distance D4 between the edge of the scanning line 2 and the edge of the picture element electrode 13 is 5 μm. According to this configuration, a parasitic capacitance per unit distance is $3.17 \times 10^{-11}$ F/m.

Figure 7:
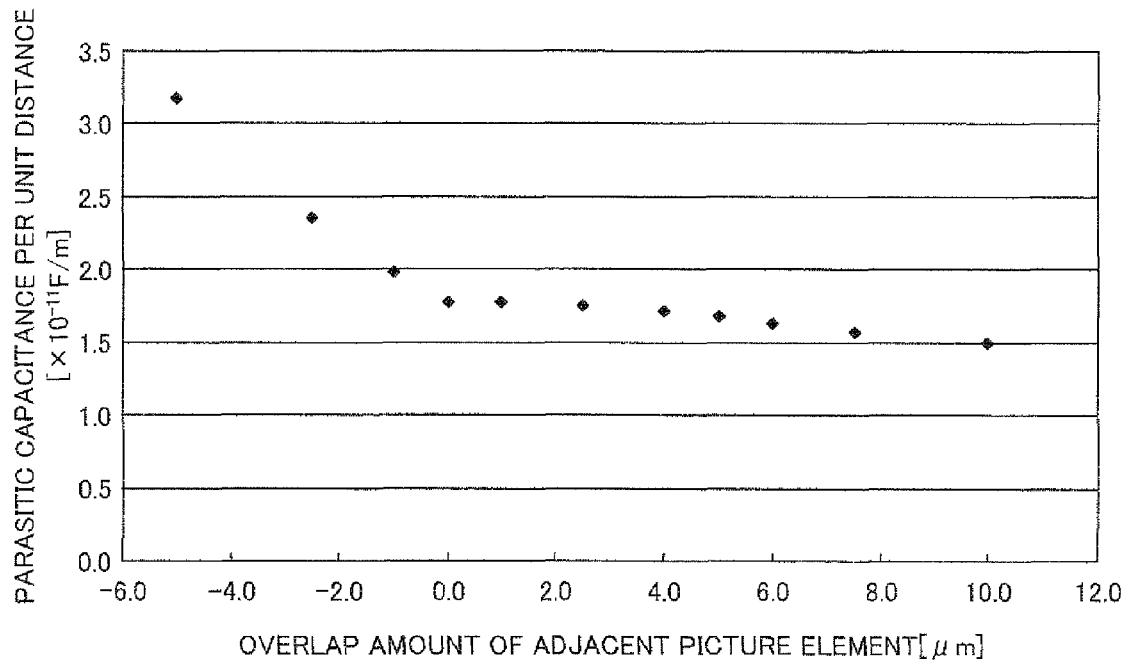
FIG. 7 is a graph showing a relation between an overlap amount of an adjacent picture element and a parasitic capacitance per unit distance.

FIG. 7 is a graph showing a relation of the overlap amount of the adjacent picture element electrode 13 onto the scanning line 2, the distance between the edge of the scanning line 2 and the edge of the picture element electrode 13, and the parasitic capacitance per unit distance. Further, Table 2 shows numerical value data at the time when the relation of FIG. 7 is established.

In the configuration of the present invention, the cut sections 13a of the picture element electrode 13 are provided on a side provided with the scanning line 2 for driving the picture element electrode 13. However, the proximity distance D2 of the picture element electrode with respect to the scanning line 2 is longer as compared to a conventional pixel shape that is longer in a vertical direction. More specifically, the proximity distance D2 of the picture element electrode 13 with respect to the scanning line 2 becomes longer from 58.5 μm of the conventional shape that is longer in the vertical direction to 113 μm.

Though the parasitic capacitance Cgd becomes larger in accordance with a length of the proximity distance D2, it is possible to reduce a trade-off that is an increase in Cgd by overlapping the adjacent picture element electrode 13 onto the scanning line 2 and causing the adjacent picture element electrode 13 to serve as a shield electrode.

Here, the comparisons of FIGS. 4, and 6 are a simulation result in a case where the aperture ratio is arranged to be identical. However, in this case, the "distance D4 between the edge of the scanning line 2 and the edge of the picture element electrode 13" which distance D4 is one of parameters of the parasitic capacitance (Cgd) between the picture element electrode 13 and the scanning line 2 is not fixed.

Figure 8:
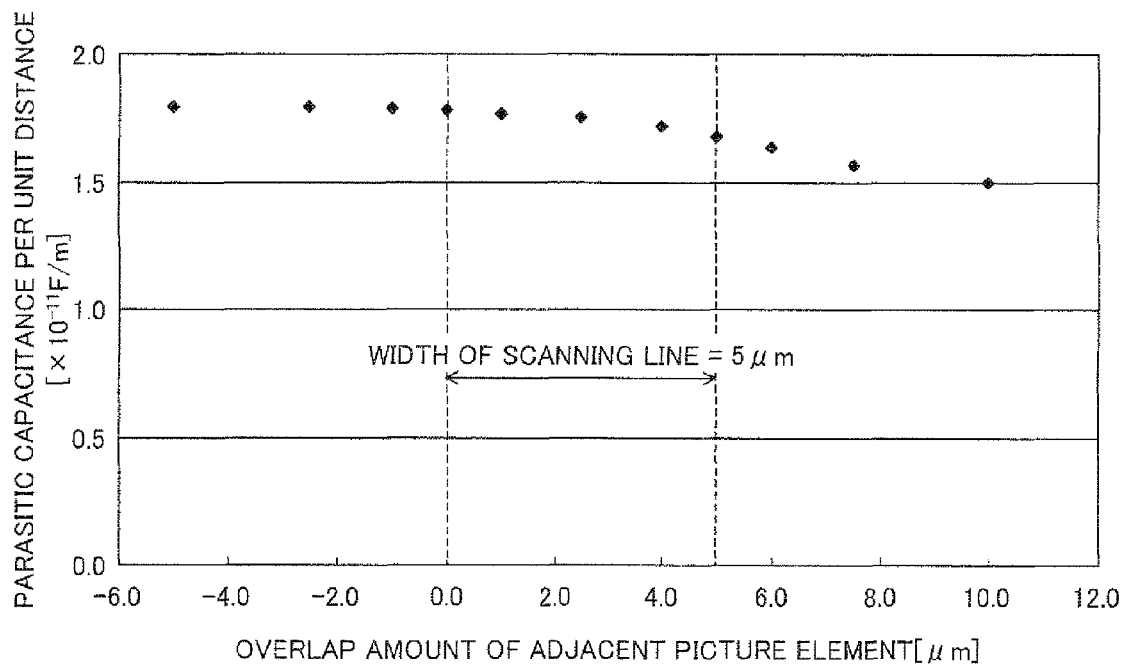
FIG. 8 is a graph showing a relation between an overlap amount of an adjacent picture element and a parasitic capacitance per unit distance.

Therefore, for checking the shielding effects of the picture element electrode 13, the distance D4 between the edge of the scanning line 2 and the edge of the picture element electrode 13 are fixed at 10 μm. This 10 μm indicates D4 set in the array substrate 10 of the present embodiment. FIG. 8 is a graph showing a result of simulating a relation of the overlap

TABLE 2

| | | | | | | | | | | | | |
|---|---|---|---|---|---|---|---|---|---|---|---|---|
| Overlap Amount of Adjacent Pixel | [um] | −5.0 | −2.5 | −1.0 | 0.0 | 1.0 | 2.5 | 4.0 | 5.0 | 6.0 | 7.5 | 10.0 |
| Distance Between Scanning Line Edge and Pixel Edge | [um] | 5.0 | 7.5 | 9.0 | 10.0 | 10.0 | 10.0 | 10.0 | 10.0 | 10.0 | 10.0 | 10.0 |
| Parasitic Capacitance Per Unit Distance | [×10⁻¹¹ F/m] | 3.17 | 2.35 | 1.98 | 1.78 | 1.77 | 1.75 | 1.72 | 1.67 | 1.63 | 1.57 | 1.49 |

According to the description above, in the configuration of the present invention, it is possible to reduce the parasitic capacitance Cgd by approximately 16% with respect to the configuration of Comparative Example (1) and to reduce the parasitic capacitance by approximately 53% with respect to the configuration of Comparative Example (2).

amount of the adjacent picture element electrode 13 onto the scanning line 2, the distance between the edge of the scanning line 2 and the edge of the picture element electrode 13, and the parasitic capacitance per unit distance in the case where D4 is fixed to 10 μm. Further, Table 3 shows numerical value data at the time when the relation of FIG. 8 is established.

TABLE 3

| | | | | | | | | | | | | |
|---|---|---|---|---|---|---|---|---|---|---|---|---|
| Overlap Amount of Adjacent Pixel | [um] | −5.0 | −2.5 | −1.0 | 0.0 | 1.0 | 2.5 | 4.0 | 5.0 | 6.0 | 7.5 | 10.0 |
| Distance Between Scanning Line Edge and Pixel Edge | [um] | 10.0 | 10.0 | 10.0 | 10.0 | 10.0 | 10.0 | 10.0 | 10.0 | 10.0 | 10.0 | 10.0 |
| Parasitic Capacitance Per Unit Distance | [×10⁻¹¹ F/m] | 1.80 | 1.79 | 1.78 | 1.78 | 1.77 | 1.75 | 1.72 | 1.67 | 1.63 | 1.57 | 1.49 |

It is clear from the graph of FIG. 8 that, as an overlap amount of the adjacent picture element electrode onto the scanning line 2 increases, the parasitic capacitance gradually decreases.

It is also clear that even if the adjacent picture element electrode 13 completely exceeds the width of the scanning line 2, the parasitic capacitance can be reduced by further increasing an amount at which the adjacent picture element electrode 13 extends over the scanning line 2.

That is, in a case where the adjacent picture element electrode 13 and the scanning line 2 overlap with each other at least when the adjacent picture element electrode 13 and the scanning line 2 are viewed in one plane, shielding effects can be obtained. It is clear that, desirably, the adjacent picture element electrode 13 completely covers the scanning line 2 and an amount at which the adjacent picture element electrode 13 extends over the scanning line 2 is increased for obtaining a stronger shielding effect.

Note that in the configuration of the present invention, by overlapping the adjacent picture element electrode 13 onto the scanning line 2, the shielding effects are obtained. However, in addition to the overlap of the picture element electrode 13, a shielding electrode 17 may be provided on the scanning line 2 as shown in FIG. 9.

The following explains a case where the shield electrode 17 is provided on the scanning line 2.

Figure 9:
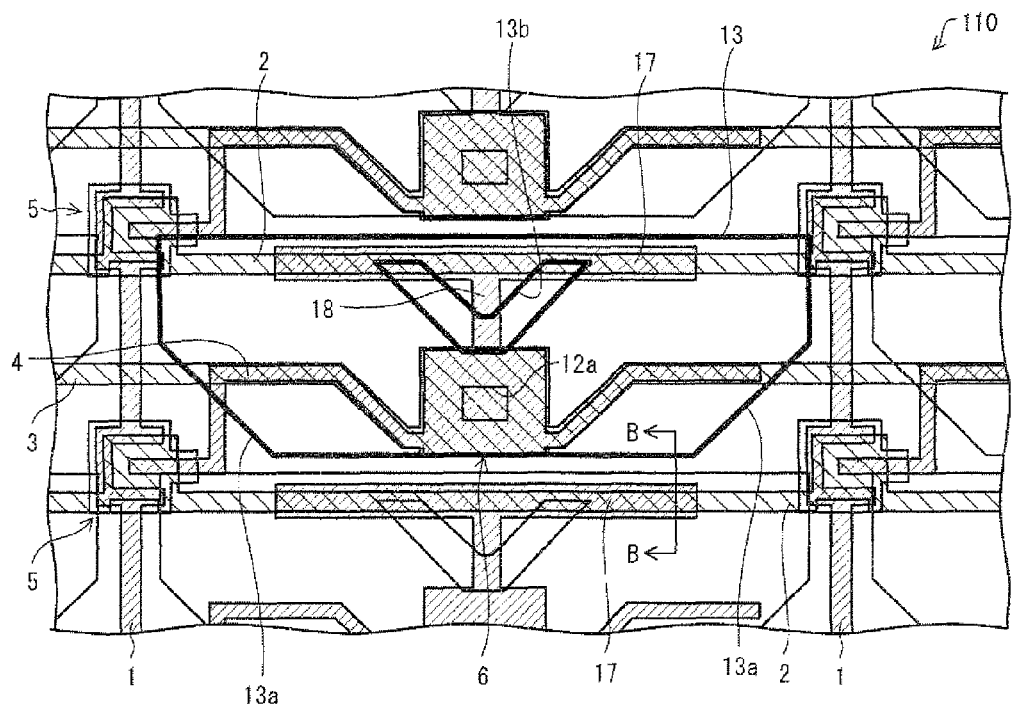
FIG. 9 is a schematic plan view illustrating an array substrate according to another embodiment of the present invention.
Figure 10:
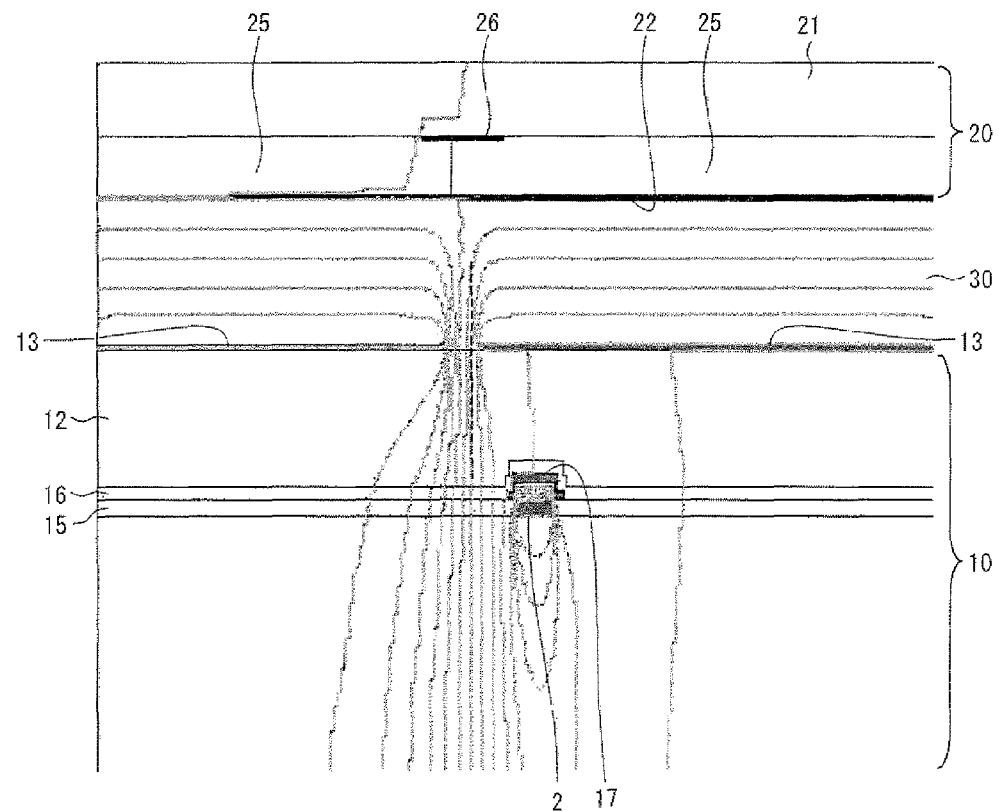
FIG. 10 is a cross sectional view taken along a line B-B in the direction of arrows in FIG. 9.

FIG. 9 is a schematic plan view illustrating an array substrate 110 that is configured in the substantially same manner as the array substrate 10 shown in FIG. 1 except that the shield electrode 17 is disposed on the scanning line 2. FIG. 10 is a cross sectional view taken along a line B-B of the array substrate 110 in the direction of arrows in FIG. 9.

As shown in FIG. 10, the shield electrode 17 is provided between the picture element electrode 13 and the scanning line 2 in a cross section. More specifically, the shield electrode 17 is provided in the same layer as the data line 1 (FIG. 9).

As shown in FIG. 9, the shield electrode 17 is electrically connected with a drain electrode 5a of the switching element 5 via a shield electrode connecting electrode 18. Desirably, the shield electrode connecting electrode 18 is provided at a bent section of the cutout section 13b of the picture element electrode 13 as alignment dividing means.

In general, a section where alignment dividing means whose directions are different or extended lines of the alignment dividing means come in contact forms a boundary section between regions having different liquid crystal alignment directions. This section is not preferable as a display area because an alignment direction is not stable or liquid crystals are aligned in undesirable directions in this section. Meanwhile, in a case where the connecting electrode is made of a drain electrode material, a section where the connecting electrode is provided does not serve as a display area. That is, as in the above configuration, the shield electrode connecting electrode 18 is provided at the bent section of the cutout section 13b. In other words, sections which do not function (which are not preferable) as a display area are superimposed. This makes it possible to prevent the effective display area from being reduced excessively.

As described above, by additionally providing the shield electrode 17, Cgd can be reduced as compared to a configuration (for example, configurations shown in FIG. 5 or 6) in which the scanning line 2 does not overlap the adjacent picture element electrode 13. This makes it possible to further reduce a trade-off that is an increase in Cgd in a configuration in which the picture element is disposed so as to be longer in a vertical direction.

More specifically, according to the configuration shown in FIG. 10, a parasitic capacitance per unit distance is $0.74 \times 10^{-11}$ F/m. As compared to the configuration of Comparative Example (1) shown in FIG. 5 described above, the parasitic capacitance Cgd can be reduced, by approximately 58%. Further, as compared to the configuration of FIG. 6 described above, the parasitic capacitance Cgd can be reduced by approximately 77%.

Figure 11:
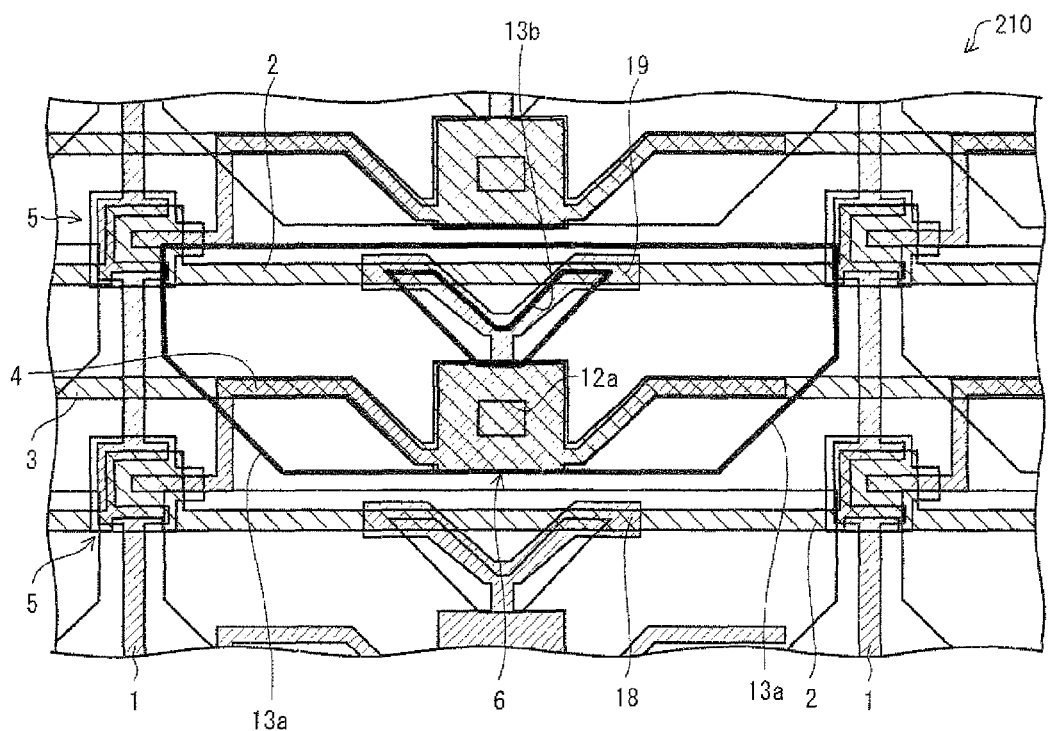
FIG. 11 is a schematic plan view illustrating an array substrate according to another embodiment of the present invention.

Note that a shape of the shield electrode 17 may be, for example, a shape of a shield electrode 19 that follows the shape of the cutout section 13b serving as the alignment dividing means of the picture element electrode 13, as shown in FIG. 11. There are various variations for the shape of the shield electrode 17.

As described above, in a form where the shield electrode 19 is disposed so as to follow the shape of the cutout section 13b, the following effects can also be obtained in addition to the reduction of Cgd.

In general, in a highly fine display device, there is a case where a layout of the alignment dividing means is limited and the cutout section 13b of the picture element electrode 13 is formed on the scanning line 2. In this case, in a period in which voltage is retained (in a period where a potential of the scanning line 2 is low), impurity ions are trapped. A section where the impurity ions are trapped becomes a peculiar point and may cause a defect in alignment of liquid crystals, that is, defect in display. Further, due to an electric field of a scanning line, liquid crystals in the vicinity of the scanning line may be aligned in an undesirable direction.

However, as shown in FIG. 11, by forming the shield electrode 19 so as to follow the shape of the cutout section 13b of the picture element electrode 13, the electric field of the scanning line 2 can be shielded. Accordingly, the defect in display can be suppressed.

Here, the following explains a size of the picture element electrode 13, with reference to FIG. 1.

As described above, the size of the whole picture element electrode 13 is arranged to be as follows: a long side along a direction in which the scanning line 2 is extended×a short side along a direction in which the data line 1 is extended=173.5 µm×58.5 µm; the proximity distance D1 of the picture element electrode 13 with respect to the scanning line 2 for driving this picture element electrode 13 is arranged to be 113 µm, and the proximity distance D2 of the picture element electrode 13 with respect to the data line 1 is arranged to be 28.25 µm.

Further, on assumption that a length L1 is a length from an edge of a cut section 13a of the picture element electrode 13 to an edge of an area where the protrusion 24 on the counter substrate 20 is projected onto the picture element electrode 13 which edge of the area is on a side provided with the cut section 13a, the length L1 is arranged to be 22 µm. A width L3 of the area on which the protrusion 24 is projected is arranged to be 11 µm. A width L4 of the cutout section 13b of the picture element electrode 13 is arranged to be 9 µm. A length L2 that is obtained by subtracting D1 from a length of a short side of the picture element electrode 13 is arranged to be 30.25 µm. A line width L5 of the data line 1 is arranged to be 5 µm. A line width L6 of the scanning line 2 is arranged to be 5 µm.

The above configuration makes it possible to significantly reduce Csd and Cgd.

In particular, if the length L1 is long, there is an advantage such that an aperture section of the picture element electrode 13 can be large. However, the long L1 makes both D1 and D2 long. Therefore, according to the present invention, even in a case where L1 is arranged to be long, it is possible to reduce Csd.

Figure 12:
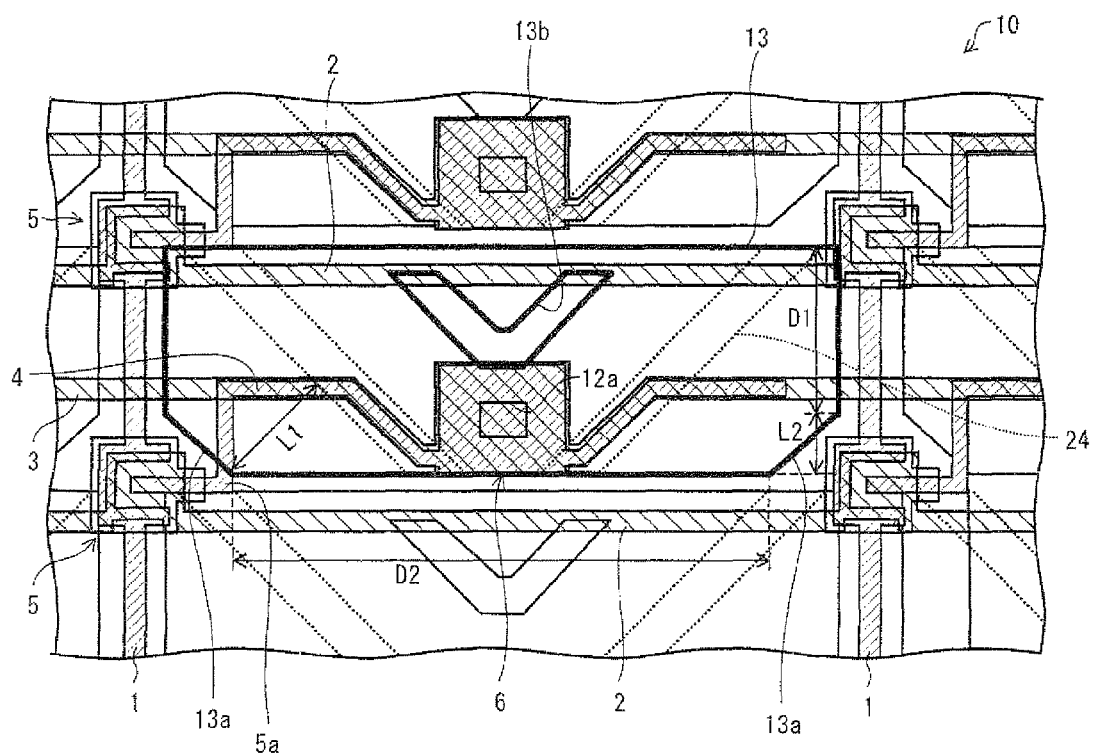
FIG. 12 is a schematic plan view illustrating an array substrate according to another embodiment of the present invention.

For example, FIG. 12 shows a configuration in which L1 is arranged to be longer than L1 of FIG. 1 (22 μm is increased to 28 μm) and the effective display area of the picture element electrode 13 is arranged to be large. In this case, the length L2 obtained by subtracting D1 from the length of the short side of the picture element electrode 13 is 14 μm which is short. Further, a length of the cut section serving as the alignment dividing means also becomes short. However, even in such a configuration, it is possible to obtain a display of a high viewing angle.

In the above case, the proximity distance D1 between the data line 1 and the picture element electrode 13 becomes 44.5 μm which is longer than that in a case where L1 is 22 μm. However, it is possible to reduce Csd.

Note that when a picture element pitch and/or a size of the picture element electrode 13 vary, an optimum layout of the cutout section 13b and the protrusion 24 for having a large effective display area also varies. In particular, in a case where L1 is arranged to be too long, a response speed of the liquid crystals tends to deteriorate. Accordingly, in a case where the picture element electrode 13 is large, it is possible to have an arrangement in which each of the cutout section 13b and the protrusion 24 is plurally provided. Therefore, while a length of L2 (for example, L2=14 μm as in FIG. 12) at which the cut section serves as the alignment dividing means is ensured, it is possible to have various layouts of the cutout section 13b and the protrusion 24 which layouts makes it possible to have an appropriate response speed and an appropriate effective display area. Even in such various layouts, according to the present invention, Csd and Cgd can be reduced.

Here, in the array substrate 10 shown in FIG. 1, a contact hole 12a is a connecting hole provided through the interlayer insulating film 12, for electrically connecting the picture element electrode 13 with the drain electrode 5a of the switching element 5. The interlayer insulating film 12 has a film thickness of approximately 1 μm to 4 μm. This film thickness is not negligible in view of a cell thickness of approximately 3 μm to 5 μm of a liquid crystal layer. Accordingly, alignment of liquid crystals around the contact hole 12a tends to be disordered. This becomes a cause of deterioration in display quality.

Figure 13:
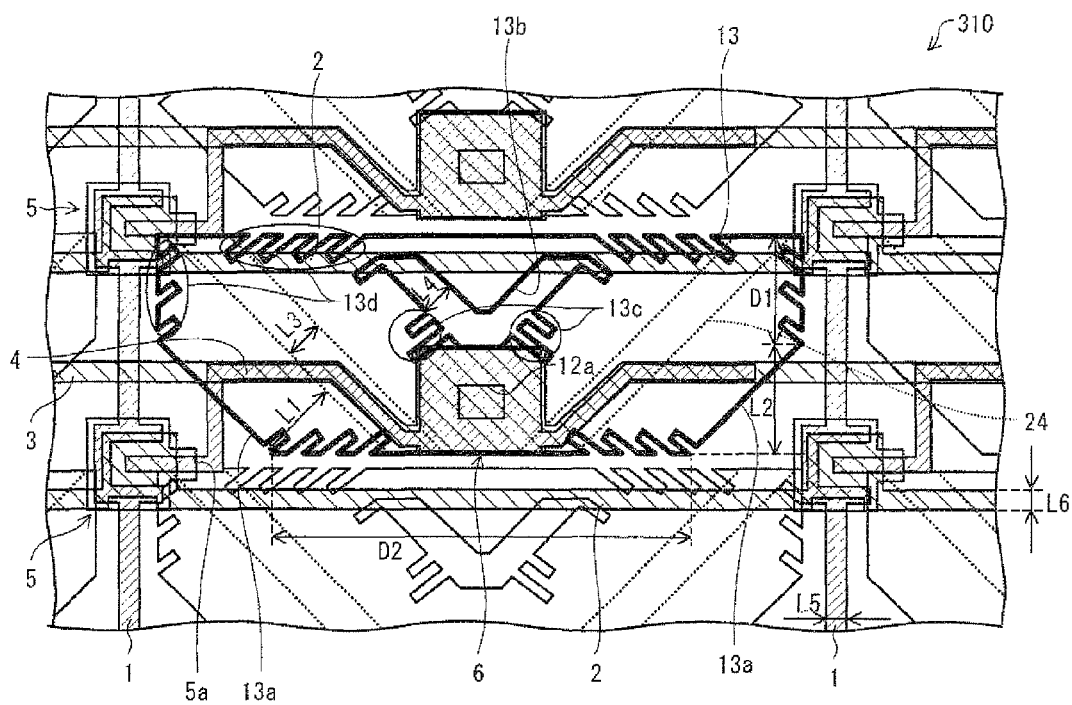
FIG. 13 is a schematic plan view illustrating an array substrate according to another embodiment of the present invention.
Figure 14:
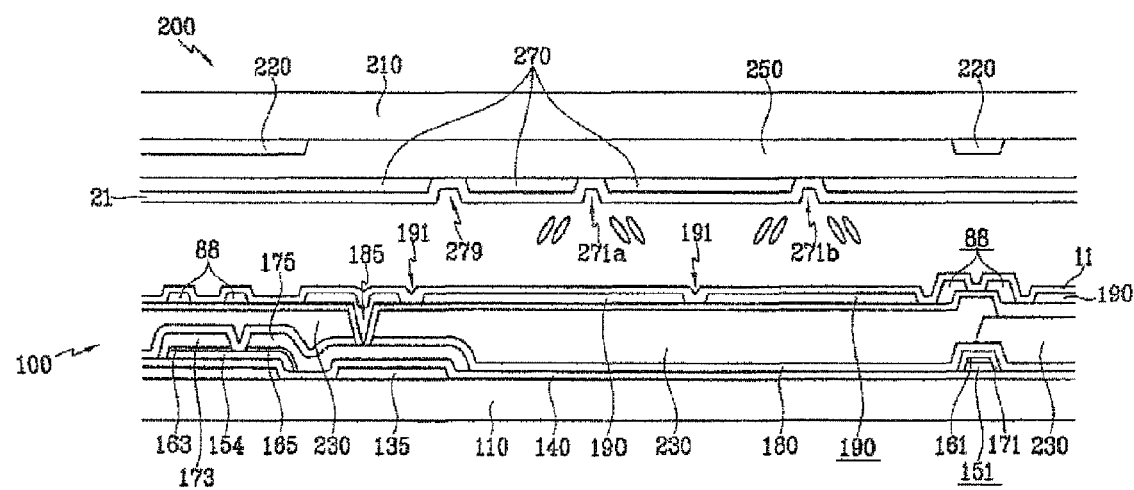
FIG. 14 is a schematic plan view illustrating a conventional liquid crystal display device.

As an example for solving the above problem, FIG. 13 shows an exemplary configuration of an array substrate that makes it possible to improve the above problem. FIG. 13 shows a modified example of the configuration of FIG. 1. In other words, an array substrate 310 shown in FIG. 13 is different from the configuration of FIG. 1 in that: (i) fine slits are additionally formed to the picture element electrode 13 of the array substrate 10 as shown in FIG. 1; and (ii) a position of the contact hole is changed.

In the array substrate 310 shown in FIG. 13, first, the contact hole 12a is formed in a position that is farther from the cutout section 13b. In the present example, the alignment dividing means of the counter substrate is arranged to be the protrusion 24 and in general, alignment regulation force caused by a fringe field of the cutout section 13b is weaker than alignment regulation force produced by the protrusion 24. Therefore, in a case where the contact hole 12a is close to the cutout section 13b, it is difficult to control disorder of alignment in a section where the contact hole 12a is formed. For suppressing the disorder in alignment, it is preferable to arrange a distance between the contact hole 12a and the protrusion 24 to be shorter than a distance between the contact hole and the cutout section 13b.

Further, in the array substrate 310 as shown in FIG. 13, an assistant slit (A) 13c is formed to the picture element electrode 13. The assistant slit (A) 13c is a slit formed to the cutout section 13b that is close to the contact hole 12a. This assistant slit (A) 13c is formed to extend in a direction that is substantially the same as a preferable alignment direction of liquid crystals, that is, a direction that is substantially orthogonal to a direction in which the cutout section 13b extends. Here, in a case where a width of the assistant slit (A) 13c is too wide, the liquid crystals are aligned in a direction that is not preferable, in other words, in a direction that is perpendicular to the assistant slit (A) 13c. Accordingly, preferably, the assistant slit (A) 13c has a width of approximately 2 μm to 4 μm. Further, preferably, a distance between adjacent assistant slits (A) 13c is also approximately 2 μm to 4 μm.

In the present example, in addition to the assistant slit (A) 13c, as shown in FIG. 13, an assistant slit (B) 13d is provided to a periphery section of the picture element electrode 13. By having such a configuration, the liquid crystals can be more stably aligned and display quality can be further improved. Note that, like the assistant slit (A) 13c, this assistant slit (B) 13d is formed so as to extend in a direction that is substantially the same as the alignment direction of the liquid crystals, in other words, in a direction that is substantially orthogonal to the direction in which the cutout section 13b extends.

As described above, by forming the assistant slit (A) 13c and the assistant slit (B) 13d to the picture element electrode 13, it is possible to control the disorder in alignment of the liquid crystals around the contact hole 12a. As a result, display quality can be improved.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is effective as a technique for improving display quality of an MVA liquid crystal display device and for reducing an implementation cost. In particular, the present invention is effective specifically in a liquid crystal display device provided in middle-size mobile products such as in-vehicle products, photo frames, IAs (Industrial Applianc), and PCs (Personal Computers).

| Reference Signs List | |
| --- | --- |
| 1 | data line |
| 2 | scanning line |
| 3 | storage capacitance line |
| 4 | storage capacitance counter electrode |
| 5 | switching element |
| 5a | drain electrode |
| 6 | storage capacitance formation section |
| 10 | array substrate |
| 11 | insulating substrate |
| 12 | interlayer insulating film |
| 13 | picture element electrode |
| 13a | cut section |
| 13b | cutout section |
| 14 | polarizer |
| 17 | shield electrode |
| 18 | shield electrode connecting electrode |
| 19 | shield electrode |
| 20 | counter substrate |
| 21 | insulating substrate |

-continued

| Reference Signs List | |
|---|---|
| 22 | common electrode |
| 23 | polarizer |
| 24 | protrusion |
| 30 | liquid crystal layer |
| 110 | array substrate |
| D1 | proximity distance |
| D2 | proximity distance |
| D3 | overlap amount |
| D4 | distance |

The invention claimed is:

1. An array substrate provided in a multi-domain liquid crystal display device in which one picture element region is divided into a plurality of sectional parts and liquid crystal molecules are aligned in directions that are different in respective sectional parts, the array substrate comprising:
an insulating substrate;
a plurality of scanning lines on the insulating substrate;
a plurality of data lines each disposed so as to intersect the plurality of scanning lines on the insulating substrate;
picture element electrodes each formed in a substantially rectangular shape, the picture element electrodes each being connected, via a switching element, to a corresponding scanning line and a corresponding data line,
the picture element electrodes each having a long side disposed along a direction in which the plurality of scanning lines are extended and a short side disposed along a direction in which the plurality of data lines are extended,
the picture element electrodes each having cut sections formed by cutting two corners of each of the picture element electrodes, the cut sections being formed so as to serve as alignment dividing means.

2. The array substrate as set forth in claim 1, wherein:
the cut sections are formed at two adjacent corners of each of the picture element electrodes.

3. The array substrate as set forth in claim 1, wherein:
each of the picture element electrodes are formed so as to cover at least a part of a scanning line for driving an adjacent picture element electrode.

4. The array substrate as set forth in claim 1, wherein:
the picture element electrodes each includes a cutout section formed and caused to serve as the alignment dividing means, the cutout section having a slit formed at an edge section of the cutout section, the slit being formed along a direction substantially orthogonal to a direction in which liquid crystals are aligned.

5. The array substrate as set forth in claim 1, further comprising:
a shield electrode formed between a picture element electrode and a scanning line for driving an adjacent picture element electrode.

6. The array substrate as set forth in claim 5, wherein:
the shield electrode is connected to a drain electrode of the switching element via a connecting electrode;
the picture element electrode has a cutout section having a letter V shape, the cutout section being formed separately from the cut sections at the two corners and serving as alignment dividing means; and
the connecting electrode is provided at a bent section of the cutout section.

7. The array substrate as set forth in claim 6, wherein:
when the cutout section of the picture element electrode is formed on the scanning line for driving the adjacent picture element electrode, the shield electrode is disposed along a shape of the cutout section.

8. The array substrate as set forth in claim 1, wherein:
when the cut sections of each of the picture element electrodes are formed at two adjacent corners along the corresponding scanning line, a cut distance of the short side of each of the picture element electrode is 14 μm or more.

9. The array substrate as set forth in claim 1, further comprising:
a storage capacitance line formed in a layer where the plurality of scanning lines are formed; and
a storage capacitance counter electrode formed in a layer where the plurality of data lines are formed, the storage capacitance counter electrode being connected to a drain electrode of the switching element,
the storage capacitance line and the storage capacitance counter electrode being formed so as to overlap with each other via an insulating film.

10. A liquid crystal display device comprising a liquid crystal panel including liquid crystals sandwiched between a counter substrate and an array substrate,
the array substrate being the array substrate as set forth in claim 1.

11. The liquid crystal display device as set forth in claim 10, wherein:
the counter substrate is provided with a protrusion serving as alignment dividing means; and
when viewed in a plane, a distance between the protrusion and a contact hole formed through the interlayer insulating film of the array substrate is arranged to be shorter than a distance between the contact hole and the cutout section formed in the picture element electrode.

12. An electronic device comprising the array substrate as set forth in claim 1.

* * * * *